United States Patent

[11] 3,634,875

[72] Inventor Bryan J. Bixby
 Pittsburgh, Pa.
[21] Appl. No. 49,310
[22] Filed June 24, 1970
[45] Patented Jan. 11, 1972
[73] Assignee Westinghouse Electric Corporation
 Pittsburgh, Pa.

[54] BIDIRECTIONAL DIRECT-CURRENT DETECTOR WITH TRANSFORMER ISOLATION
 10 Claims, 5 Drawing Figs.

[52] U.S. Cl. ............................................. 324/98,
 324/99 R, 324/117 R, 324/140 R, 332/12
[51] Int. Cl. ............................................. G01r 17/02,
 G01r 33/00
[50] Field of Search ..................................... 324/98, 99
 R, 140 D, 140 R, 120, 117 R, 127, 43; 329/106,
 104, 105, 102; 332/12

[56] References Cited
 UNITED STATES PATENTS
 2,994,840 8/1961 Dorsman ........................ 332/12
 3,396,338 8/1968 Buchanan et al. ............. 324/120 X
 3,490,042 1/1970 Darrow .......................... 324/117

Primary Examiner—Rudolph V. Rolinec
Assistant Examiner—Ernest F. Karlsen
Attorneys—F. H. Henson, C. F. Renz and A. S. Oddi ABSTRACT: A DC-detector wherein the DC to be detected is utilized to modify the amplitude and mark-space timing of an oscillator utilizing a common magnetic circuit and wherein the so-modified output is integrated and differentially amplified to provide a bidirectional output indicative of the amplitude and direction of the DC being detected.

FIG. 1

INVENTOR
Bryan J Bixby

BIDIRECTIONAL DIRECT-CURRENT DETECTOR WITH TRANSFORMER ISOLATION

BACKGROUND OF THE INVENTION

1. Field of the Invention

The present invention relates to DC detection circuitry and, more particularly, to such circuitry capable of detecting both direction and amplitude of the direct current.

2. Discussion of the Prior Art

In many control applications it is required that a DC current be detected and an indication be given of the magnitude thereof in order to control maximum current limits. Other applications require the control of an output as a function of a low-level DC reference signal. It is highly desirable that electrical isolation be provided between the input DC to be detected and the output provided in response thereto. A commonly used technique in the prior art for DC detection is the so-called DC transformer technique wherein a pair of transformers having saturable and matched cores are utilized with the primary and secondary windings thereof being respectively connected in series. To the primary winding an alternating signal, in the form of a square waveform for example, is applied through a diode bridge with a DC meter connected across the bridge so that current in only one direction is passed therethrough. The DC signal to be monitored is applied to the series connected secondary windings. According to the magnitude and direction of a direct current applied to the secondary windings one of the transformers will saturate sooner and the other will saturate later during the respective saturating half cycles for the transformers. With the DC meter at a reference point with no DC in the secondary winding as the magnitude of the DC increases the reading of the DC meter will accordingly increase in a substantially linear fashion. This increase will occur regardless of the direction of the current applied to the secondary windings. Thus no indication of the direction of the secondary current is provided by this technique. Moreover the linearity of the output does not extend all the way to a zero input due to the magnetizing current required in the transformers.

It can therefore be seen that it would be highly desirable to provide a DC detection circuit wherein the direction of the current to be detected is provided, the requirement for matched transformer cores is eliminated and the output is a linear function of the input through the zero DC input level in both directions.

SUMMARY OF THE INVENtion

Broadly, the present invention provides a DC detection system wherein an output indicative of the magnitude and direction of the signal to be detected is provided by modulating the amplitude and mark-space timing of an oscillator and integrating the modulated signal, with the variation of the integrated signal being indicative of the magnitude and direction of the signal being detected.

DESCRIPTION OF THE PREFERRED EMBODIMENT

Figure 1:
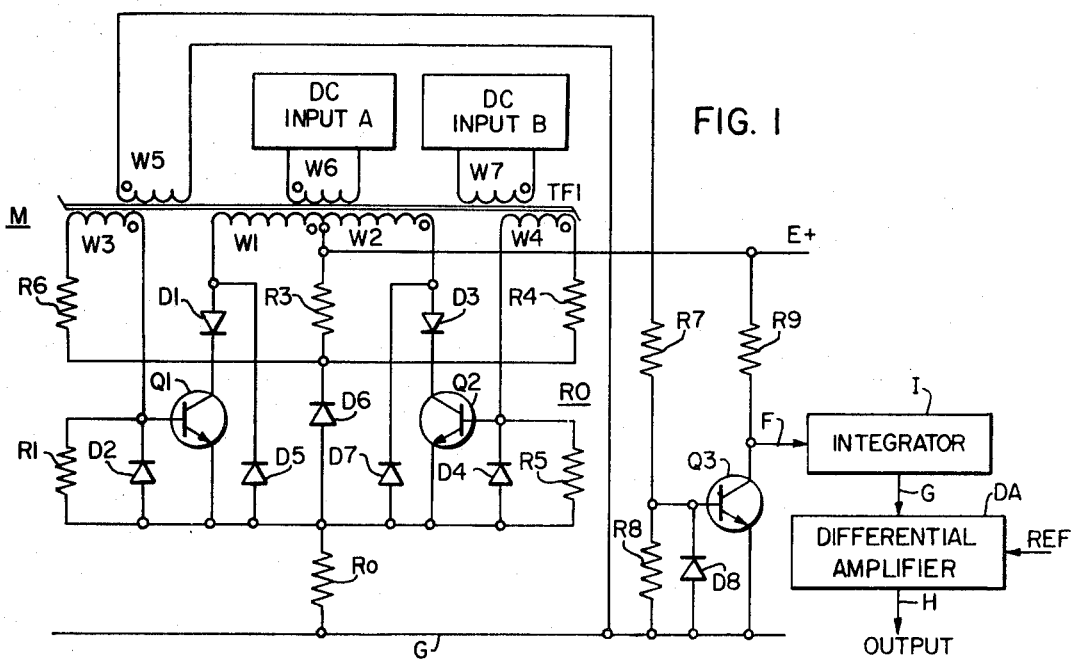
FIG. 1 is a schematic-block diagram of one embodiment of the present invention.
Figure 2:
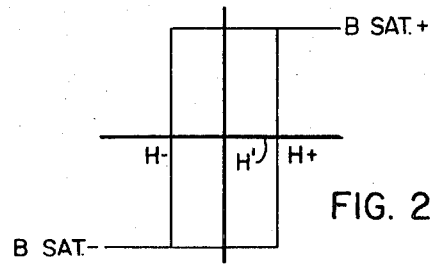
FIG. 2 is a plot of the B–H loop as utilized in the transformer of the present invention.

Referring to FIG. 1, an oscillator circuit R0 is shown which is of the magnetically coupled free-running type commonly known as a Royer oscillator. The oscillator includes a pair of transistors Q1 and Q2 which are alternately conducting. A magnetic coupling is provided by transformer windings W1, W2, W3 and W4 which comprise the 2 windings of a transformer TF1. The transformer TF1 includes a core M upon which all the windings are wound and which comprises a magnetic material having a square loop B–H characteristic such as shown in FIG. 2. The operating voltage for the circuit is a voltage E+ which is applied at the junction point of the windings W1 and W2. As indicated on FIG. 1 this is the dotted end of the winding W1 and the undotted end of the winding W2. The dot convention will be utilized throughout the following discussion wherein when the dotted end of a given transformer winding is at a positive polarity this condition will exist correspondingly at the dotted ends of the responsive windings.

Assume initially that the transistor Q1 is conductive so that a current path is provided from the E+ line, through the winding W1 into the dotted end thereof, through the diode D1, the transistor Q1 and a resistor R0 to the common line G. At this time the transistor Q2 is nonconductive. In response to the current flow in the winding W1, the dotted end of the winding W3 becomes positive to drive the transistor Q1 into full conduction with the dotted end of the winding W3 being connected directly to the base of the transistor Q1. A resistor R1 is connected between the base and emitter of the transistor Q1 and a diode D2 is connected from anode to cathode between the emitter and base of the transistor Q1 to protect this junction.

The full conduction of the transistor Q1 will continue until a transformer core M becomes saturated in the positive direction at Bsat+ as shown in FIG. 2. At this time the voltages induced across the windings W3 and W4 will go to zero. With no voltage being provided by the winding W3, base drive will be removed from the transistor Q1 which will cease conduction. Thus magnetizing current is removed from the winding W1 and the core flux will thus revert to a remanence level. In response to the core flux running back to a remanence level plus current flowing in the circuit including a resistor R3 having one end connected to the E+ line, a resistor R4, the winding W4 and the base-emitter circuit of the transistor Q2 and the resistor R0 to the common line G, the transistor Q2 will be rendered conductive. The conduction of the transistor Q2 causes current flow from the E+ line into the undotted end of the winding W2 through a diode D3, the collector-emitter circuit of the transistor Q2 and the resistor R0. The undotted end of the winding W2 being positive will cause the undotted end of the winding W4 to be positive at the base of the transistor Q2 thereby driving the transistor Q2 into full conduction. A resistor R5 and diode D4 are connected between the base and emitter of the transistor Q2. The diodes D1 and D3 respectively connected in series with the collector-emitter circuit of the transistors Q1 and Q2 are of the fast-acting type to insure that a fast rise wave front is provided with the switching-on of the respective transistors Q1 and Q2.

The transistor Q2 will remain in full conduction until the core M saturates in the negative direction at Bsat−, as shown in FIG. 2, at which time the voltage across the windings W4 and W3 will go to zero. The transistor Q2 will be rendered nonconductive thereby deenergizing the winding W2 and causing the core flux to return to a remanence flux level and also cause current flow via the resistor R3, a resistor R6 connected to the undotted end of the winding W3, the winding W3, the base-emitter circuit of the transistor Q1 and the resistor R0 to the common line G to thereby render conductive the transistor Q1.

With the turning on of the transistor Q1, a current path is again provided from the E+ line, through the winding W1, the diode D1, the collector-emitter circuit of the transistor Q1 and the resistor R0. This then establishes one complete cycle of operation with the transistors Q1 and Q2 being alternately rendered conductive with the alternate positive and negative saturation of the transformer M-core occuring. Accordingly, it can be seen that the transistor Q1 conducts while the core flux changes from Bsat− to Bsat+ and the transistor Q2 conducts while the flux changes from Bsat+ to Bsat−. The rate at which the core flux changes is a direct function of the voltage E+ minus the voltage developed across R0 applied to the primary windings W1 and W2.

The oscillator circuit is completed by a diode D5 and a diode D6 connected from anode to cathode between the emitters of the transistors Q1 and Q2, respectively, and the anodes of the diodes D1 and DD, respectively, and a diode D7 connected between the top end of the resistor R0 and the bottom end of the resistor R3. The function of the respective diodes D5 and D6 is to prevent reverse voltages from being applied across the collector-emitter circuits of the transistors Q1 and Q2.

The secondary windings of the transformer TF1 comprise a winding W5, a winding W6 and a winding W7. The winding W6 is supplied from a DC input A which may supply a unidirectional current either into the dotted end of the winding W6 or out of the dotted end thereof. The winding W7 is connected to a DC input B which may supply a unidirectional input either into or out of the dotted end thereof. Assume for the time being that the DC input B and the winding W7 are not being utilized. Further assume that the DC input A is supplying no direct current to the winding W6. Under these conditions the oscillator R0 will be operating symmetrically. That is, the time required for the magnetic core M to go from a Bsat+ to a Bsat− condition will be equal to the time required to go from the Bsat− condition to the Bsat+ condition. This will result in equal mark and space-timing for the oscillator as will be discussed further below.

Under the condition that no DC current is supplied to the winding W6, the voltage applied to either the transformer winding W1 or W2 will be equal to the operating voltage E+ minus the voltage across the resistor R0 neglecting the forward drops of the semiconductor devices. The B–H loop of the magnetic material of the core M being inherently symmetrical the voltage developed across the resistor R0 will be equal when either transistor Q1 or transistor Q2 is conductive.

Figure 3:
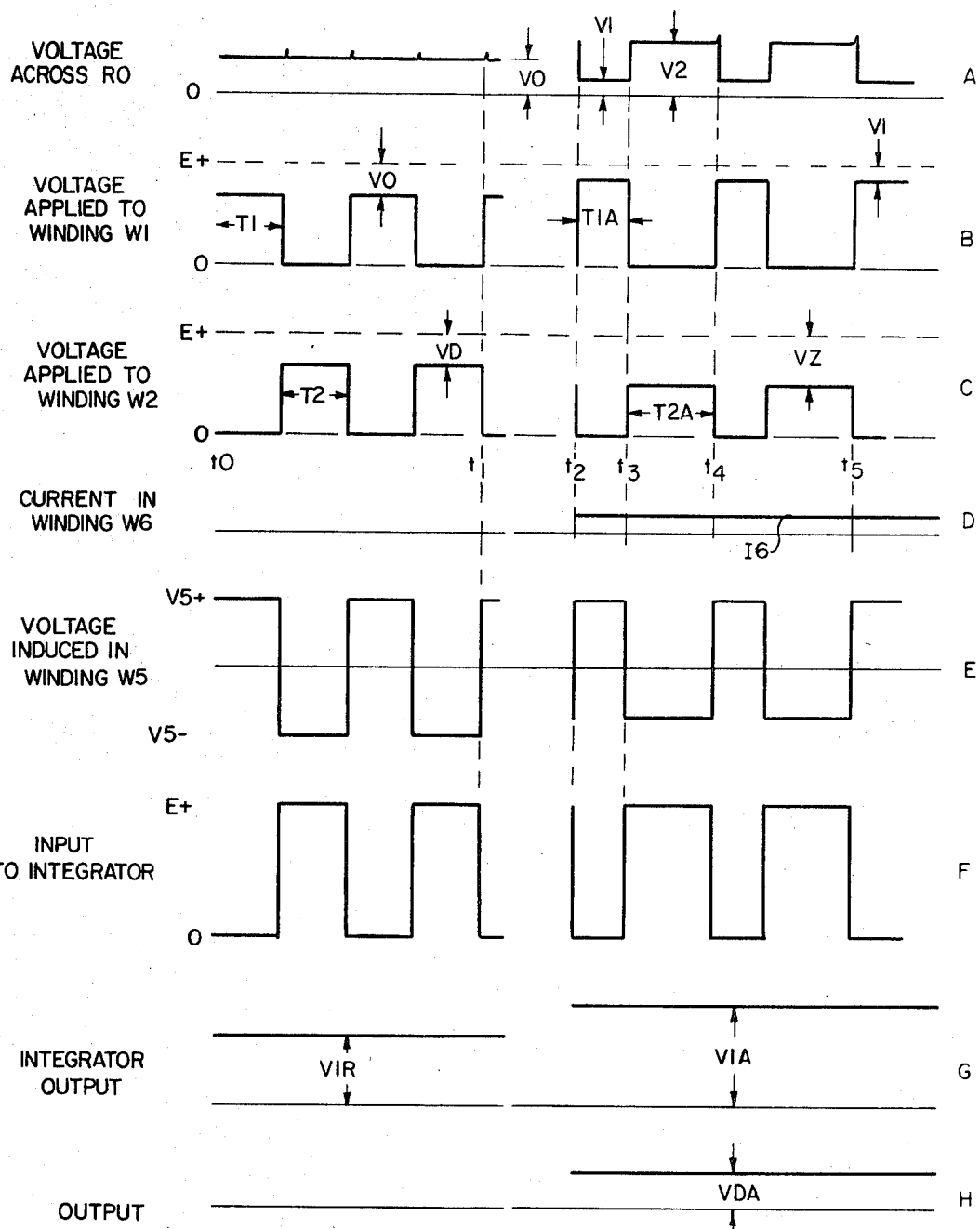
FIG. 3 is a waveform diagram including a plurality of curves used in explaining the operation of the present invention.

Referring now also to the curves of FIG. 3, curve A thereof shows the voltage V0 being developed across the resistor R0 during the time period T0–T1 under the assumption that no current is applied to the winding W6. The spikes in the voltage waveform V0 are due to the turning on and turning off of the respective transistors Q1 and Q2. Curve B shows the voltage developed across the winding W1 with the transistor Q1 conductive to be equal to E+−V0. Curve C shows the voltage developed across the winding W2 with the transistor Q2 conductive to also be equal to E+−V0. Note that the time period T1 that the transistor Q1 is conductive is equal to the time period T2 that the transistor Q2 is conductive due to the symmetry of the core material of the transformer TF1.

Curve D shows the current I6 in the winding W6 which is zero during the time period T0–T1. Curve E shows the voltage induced in the secondary winding W5. Note that this is an alternating voltage varying from V5+ to V5−. This is due to the dot convention on the winding W5 with respect to the windings W1 and W2. Hence when the dotted end of the winding W1 becomes positive with the conduction of the transistor Q1 the dotted end of the winding W5 will be positive. Conversely, when the transistor Q2 is conductive and the undotted end of the winding W2 is positive the undotted end of the winding W5 will be positive. The time duration of the positive and negative half cycles of the voltage V5 across the winding W5 will be equal to the time periods T1 and T2 as shown in curves B and C.

A voltage divider including a resistor R7 and a resistor R8 is connected across the winding W5 with the undotted end thereof being connected to the common line G. The base of a switching transistor Q3 is connected to the junction point of the resistors R7 and R8. The collector of the transistor Q3 is connected via a resistor R9 to the E+ line and the emitter thereof is connected to the common line G. A diode D8 is connected between the emitter and base to protect the base emitter junction thereof. The transistor Q3 is of the NPN-type and thus is turned on in response to the voltage V5+ applied thereto and is turned off in response to the voltage V5− applied thereto. The output at the collector of the transistor Q3 is shown in curve F of FIG. 3. The transistor Q3 is conductive when the transistor Q1 is conductive so the output thereof will be substantially zero volts during the time period T1. When the transistor Q2 is conductive the transistor Q3 is nonconductive so that an output voltage of substantially the supply voltage E+ will be provided at the collector thereof. Note that the nonconductive and conductive time periods of the transistor Q3 are equal with no current being applied to the winding W6.

The waveform of curve F of FIG. 3 at the collector of the transistor Q3 is applied to an integrator I for integration therein. The output of the integrator is shown in curve G and comprises the DC level of the waveform F supplied in the integration process. For equal conductive and nonconductive periods an output is supplied from the integrator I. The voltage level VIR thus defines a reference output indicative that no DC current is flowing in the winding W6 and any deviation of the output of the integrator I from the value VIR will indicate the presence of such a current.

The output G of the integrator I is supplied to a differential amplifier DA to be compared with a reference input. The reference input is selected to be at the voltage level VIR so that when the integrator I supplies the reference output VIR the differential amplifier DA will supply an output H at a zero voltage level as shown in curve H of FIG. 3 during the time period T0–T1 when there is zero current T0–T1. winding W6.

Hence with equal conductive periods for the transistors Q1 and Q2 and accordingly equal nonconductive periods a 1 to 1 mark-to-space ratio is effected so that the mark-to-space ratio of the transistor Q3 is also 1 to 1 thereby causing the integrator I to supply an output VIR equal to the reference input thereto causing a zero-output H to be provided by the differential amplifier DA during the time period T0–T1.

At a later time T2, assume that the DC input A supplied a direct current to the winding W6 of a value I6 into the dotted end of this winding of a magnitude as shown in curve D of FIG. 3. The current I6 will cause some magnetizing force H' as shown in FIG. 2 to be applied to the core M of the transformer TF1. Therefore, when the transistor Q1 conducts the total magnetizing force applied to the core M by the winding W1 is the difference between the value H+ and the value H' so that the current flowing in the resistor R0 is reduced so that the voltage thereacross is reduced to a value V1 during the time period T2 to T3 when the transistor Q1 is conducting as shown in curve A of FIG. 3. When the transistor Q2 conducts during a time period T3 to T4, the magnetizing force applied to the core M by the winding W2 is the value H− plus the value H' thereby increasing the current through the resistor R0 so that an increased voltage V2 is developed across the resistor R0 during the time period T3 to T4. Hence, as shown in curve B of FIG. 3 the voltage applied to the winding W1 is increased during the time period T2 to T3 as compared to the no current case and the voltage applied to the winding W2 during the time period T3 to T4 is decreased as compared to the no current case.

Since the rate of change of core flux is a direct function of the voltage applied to the respective windings W1 and W2, when the transistor Q1 is conductive the time taken for the flux to change from Bsat− to Bsat+, that is, the time period T1A as shown in curve B of FIG. 3, will be less than the time period T1 under no DC current in winding W6. Conversely, when the transistor Q2 is conductive due to the lower voltage applied to the winding W2, a longer time period T2A will be required for the transformer core M to change from the Bsat+ flux level to the Bsat− flux level as compared to the time period T2 when no current is applied to the winding W6.

Accordingly as shown in curve E of FIG. 3 the voltage induced in the winding W5 will be of a higher magnitude during the positive half-cycle of a time-duration T1A, while the voltage induced during the negative half-cycle will be of a lower magnitude but with a longer time duration of T2A. In response to the voltage across the winding W5, the transistor will be rendered conductive for a zero voltage space period of T1A and will be rendered nonconductive for a mark period of T2A wherein the voltage E+ will be supplied to the integrator I.

As can be seen by comparing waveform F during the time period T2 to T5 with the time period T0 to T1, the integrated value VIA of the waveform during the time period T2 to T5 is larger than the value VIR during the time period T0 to T1, as shown in curve G. The output of the integrator I at the higher value VIA, as compared to the output VIR for the no current case, is applied to the differential amplifier DA where it is compared with the reference value which remains at the value VIR; therefore, a difference output is provided by the differential amplifier DA equal to the difference between VIA and VIR, which is shown in curve H of FIG. 3 to be the value VDA. The signal VDA has a positive polarity and is thus indicative of the fact that current is provided into the winding W6 form the DC input A and has a magnitude corresponding to the magnitude VDA outputted by the differential amplifier DA.

Taking the converse of the situation described above wherein the DC input A supplies a current into the dotted end of the winding W6, assume now that the current is supplied in the reverse direction out of the dotted end of the winding W6. Under this condition a smaller voltage will be applied to the winding W1 than the winding W2 so that a smaller voltage will be induced during the positive half-cycle across the winding W5 lasting for a longer time duration than the larger negative voltage induced across the winding W5 during a shorter time period. Hence the conductive period of the transistor Q3 will be longer than its nonconductive period which will thus decrease the integrated output of the integrator I to a lower value than the reference value VIR. This will make the reference value to the differential amplifier DA larger than the value from the integrator I so that the differential amplifier DA will supply a negative output voltage which is indicative of the reverse direction of flow of the current in the winding W6 of a value corresponding to the magnitude of the current flow in the winding W6.

The output H from the differential amplifier DA may be utilized for a number of purposes including monitoring the current flowing in a load such as the armature of a DC motor and also may be used as an indication of an over current condition in the load. Also the output H may be utilized for other control functions wherein a current output corresponding in magnitude and polarity to a detected current is required and wherein isolation from the detected current is also required.

The configuration as shown in FIG. 1 may be employed for purposes which would be otherwise difficult wherein electrical isolation is required between various input and output signals. For example suppose that it is desired to compare a direct current supplied by the DC input A with a direct current supplied by the DC input B. The comparison may be either to algebraically add or subtract the current supplied to the respective windings W6 and W7 from the DC inputs A and B. If for example the current supplied by the inputs A and B should differ greatly in magnitude and electrical isolation is required therebetween, by the proper selection of the number of turns for the respective windings W6 and W7 according to the appropriate relationship for the expected current magnitudes, the circuit of FIG. 1 can be utilized to provide an output from the differential amplifier DA indicative of the algebraic sum of the currents supplied to the windings W6 and W7.

Thus, for example, assume that it is desired to provide an output from the differential amplifier DA indicative of the current in winding W6 minus the current in winding W7. Further assume that the current applied to the winding W6 is typically approximately ten times that as applied to the winding W7. Under these circumstances the number of turns used for the winding W7 would be selected to be ten times that of the winding W6. Thus for subtraction of these currents the DC input A would supply current into the dotted end of the winding W6 and the DC input B would supply current out of the dotted end of the winding W7. Under the assumed conditions, when the current in the winding W6 was ten times the current in the winding W7, a null condition would exist since the magnetic intensity (amp. turns) provided by the current in the winding W6 would be balanced by the opposing magnetic intensity due to the current in the winding W7 with ten times the number of turns. Accordingly, a zero-null output would be provided at H from the differential amplifier DA. When the current in winding W6 should exceed ten times the value of the current in the winding W7, a positive output would be provided by the differential amplifier A, and, conversely, a negative output would be provided when the current was less than ten times the current.

The advantage of such an addition/subtraction system is that by proper choice of turns-ratio large currents can be added or subtracted with low-level currents. Moreover, the system provides transformer isolation so that there is no need to connect directly signals to be added electrically. Also the system is linear to zero-input current as discussed previously.

Another important application for the invention as shown in FIG. 1 is that of load-balancing between DC power supplies having different output current ratings. For example, assume that the DC input A and the DC input B are DC power supplies and it is desired that their outputs are to be connected in parallel and that the current rating of the supply A is ten times that of the supply B. By the use of the configuration of FIG. 1 loads supplied by each of the supplies A and B may be balanced according to their corresponding ratings. The winding W7 supplied by the DC input B would be selected to have a turns-ratio of 10 to 1 compared to the winding W6. Also the input B would be connected so that current flows out of the dotted end thereof when current flows into the dotted end of the winding W6 thus effecting a subtraction of the magnetic intensities caused by current flow in the respective windings W6 and W7. When the input A is supplying current at the ratio of 10 to 1 compared to the input B, the output H of the differential amplifier DA will be zero. If the output H is positive, this is indicative that the current in the winding W6 exceeds the 10 to 1 ratio. The output H may be utilized for either decreasing the output of the DC input A or increasing the output of the supply B. Conversely, if the output H should be negative this would be indicative that the ratio of current between the windings W6 and W7 is less than 10 to 1 requiring an increase in the output of A or a decrease in the output of B.

Figure 4:
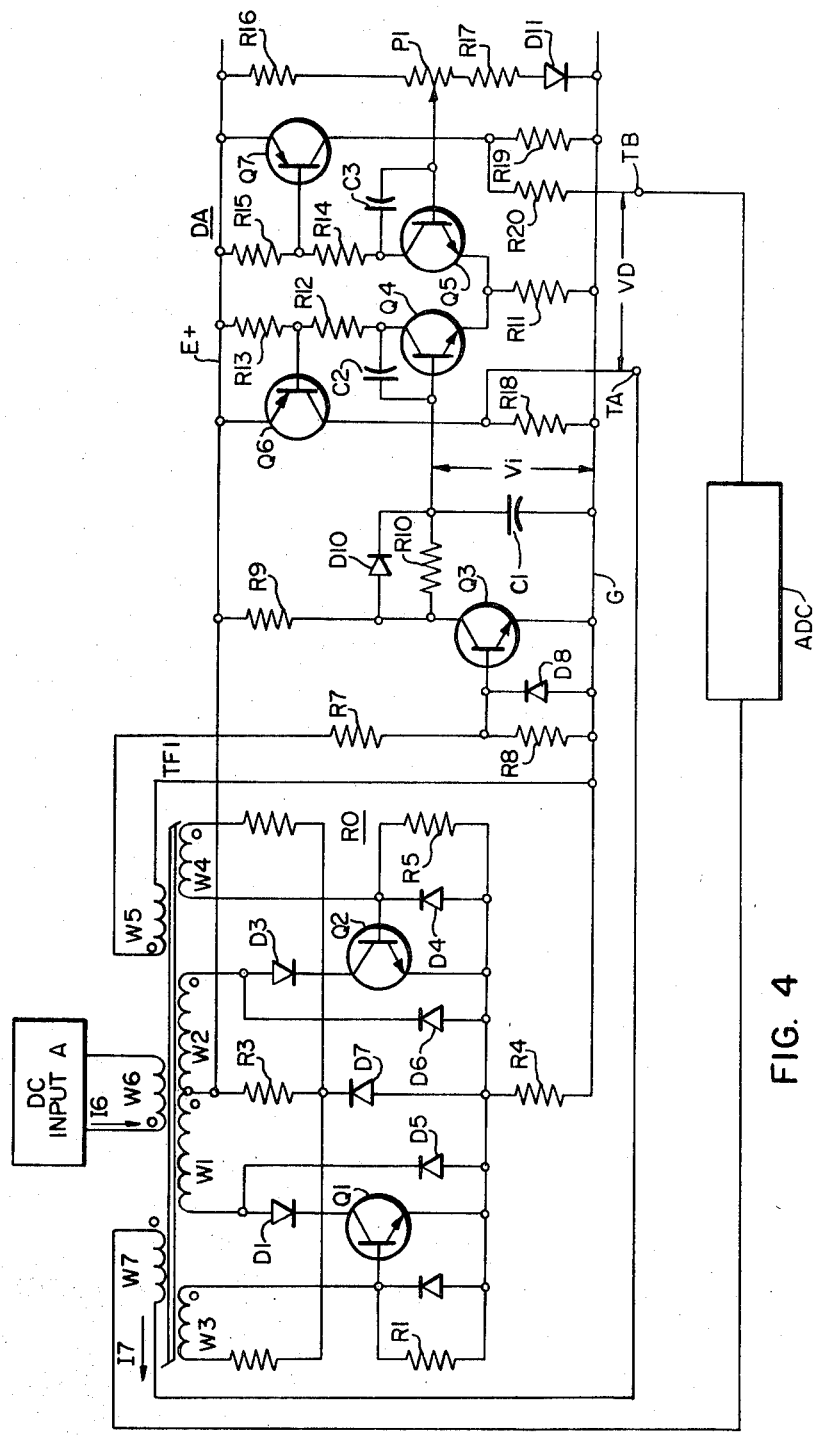
FIG. 4 is a schematic diagram of a closed loop form of the present invention.

FIG. 4 shows a closed loop version of the system of FIG. 1 where it is desired to monitor the current in the winding W6 and wherein the specific circuitry for the integrator I and the differential amplifier DA is shown. The circuitry for the oscillator RO is identical to that as shown in FIG. 4 as is the transformer TF1 configuration except that the winding W7 is supplied from the output of the differential amplifier DA.

The integrator I is shown to include a resistor R10 and a capacitor C1. The resistor R10 is shunted by a diode D10. One end of the resistor R10 is connected to the collector of the switching transistor Q3 and the other end thereof is connected to the capacitor C1 which has its other end connected to the common line G. The output of the integrator is taken at the junction point of the resistor R10 and the capacitor C1 and applied to the base of a transistor Q4 which comprises one of the active elements of the differential amplifier DA.

When the transistor Q3 is nonconductive the capacitor C1 charges from the E+ line via the resistor R9 and the diode D10. When the transistor Q3 is turned on, the capacitor C1 then discharges through the resistor R10 and the collector emitter circuit of the transistor Q3. The resistors R9 and R10 and the capacitor C1 are so selected that over a given cycle of operation a net voltage is developed across the capacitor C1 which is indicated to be the voltage VI. When the conductive and nonconductive periods of the transistor Q3 are equal, when no current is applied to the winding W6, the voltage supplied from the integrator I will be the reference voltage VIR as shown in curve G of FIG. 3. When current is applied to the winding W6, the voltage VI will vary from the reference value VIR in accordance with the magnitude and direction of the current through winding W6. Hence, if the transistor Q3 is nonconductive for a longer period of time than it is conductive, such as shown during the time-period T2–T5 of curve F of FIG. 3, the capacitor C1 will charge to a higher voltage, such as the value VIA as shown in curve G of FIG. 3. Conversely, if the transistor Q3 is nonconductive for a period of time smaller than the period of time that it is conductive, the capacitor C1 will charge to a voltage lower than the reference voltage VIR in that the capacitor C1 will have a shorter charging time as compared to its discharging time.

In the differential amplifier DA, the complementary device to the transistor Q4 is a transistor Q5. The emitters of the transistors Q4 and Q5 are commonly connected and an emitter resistor R11 is connected between this common connection and the common line G. The collector of the transistor Q4 is connected to the E+ line via a voltage divider including a resistor R12 and a resistor R13. The collector of the transistor Q5 is connected to the E+ line via a voltage-divider network including a resistor R14 and a resistor R15. Filter capacitors C2 and C3 are connected respectively between the base and collector electrodes of the transistors Q4 and Q5.

The base of the transistor Q5 is connected to the tap on a potentiometer P1 which forms a part of a voltage divider network including a resistor R16 connecting the top end of the potentiometer P1 to the E+ line and a resistor R17 and a diode D11 (for temperature compensation) connecting the bottom end of the potentiometer P1 to the common line G.

In order to amplify the output of the transistors Q4 and Q5, PNP-type transistors Q6 and Q7 are respectively provided. The base of the transistor Q6 is connected to the junction between the resistors R12 and R13 in the collector circuit of the transistor Q4, with the emitter of the transistor Q6 being connected to the E+ line and the collector thereof connected via a resistor R18 to the common line G. The amplified output is then taken at the collector of the transistor Q6. Similarly, the transistor Q7 has its base electrode connected to the junction of the resistors R14 and R15. The emitter thereof is connected to the E+ line and the collector is connected via a resistor R19 to the common line G with the amplified output appearing at the collector of the transistor Q7. The collector of the transistor Q6 is connected to the undotted end of the winding W7 and the collector of the transistor Q7 is connected via a resistor R20 to one end of a DC ammeter ADC which has its other end connected to the dotted end of the winding W7. The differential output voltage VD thus appears between the collector of the transistor Q6 at a terminal TA and the junction of the resistor R20 and the ammeter ADC at a terminal TB.

Under balanced conditions, with no DC current being applied to the winding W6 and a reference voltage VIR being applied to the base of transistor Q4, the potentiometer P1 at the base of the transistor Q5 is adjusted so that the differential amplifier output voltage VD provides a zero-null output.

If now a DC current is provided into the dotted end of the winding W6, such as shown in curve D of FIG. 3, so that the voltage applied to the base of transistor Q4 increases above the reference value VIR to a value VIA, the transistor Q4 will conduct more current than the transistor Q5 therefore the transistor Q6 will conduct more current and develop a larger voltage across the resistor R18 as compared to the voltage developed at the terminal TB. With the terminal TA positive with respect to the terminal TB, current will be supplied into the undotted end of the winding W7 and will pass through the ammeter ADC from the terminal TA to the terminal TB. The magnitude of this voltage will be a direct function of the output voltage of the differential amplifier VD developed between the terminals TA and TB.

Figure 5:
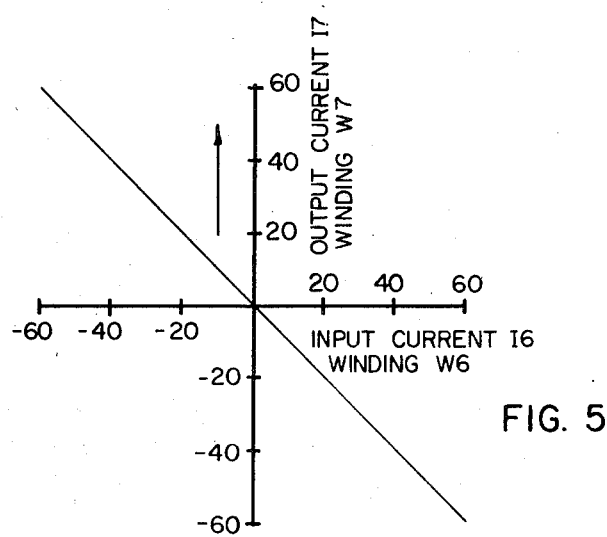

A plot of the current in the input winding W6 as compared to the current in the output winding W7 is shown in FIG. 5. The plot of FIG. 5 shows that as the input current I6 increases in the positive direction (that is, into the dotted end of the winding W6), the output current I7 in the winding W7 increases linearly in the negative direction (that is, out of the dotted end thereof). The linearity continues down to the origin at zero-input current and zero-output current in response thereto. The ammeter ADC provides the magnitude of the output current I7 and also the direction of flow. Thus, the magnitude and direction of the current I6 being monitored could be ascertained readily.

If the input current I6 to the winding W6 were reversed so that current now flows in the reverse direction out of the dotted end of the winding W6, the voltage applied to the transistor Q4 of the differential amplifier DA would be lower than the reference voltage applied to the base of transistor Q5; therefore the terminal TB would become positive with respect to the terminal TA. In response to a more positive voltage on the terminal TB current would now flow from the terminal TB through the ammeter ADC into the dotted end of the winding W7. As shown in the plot of FIG. 5, as the input current I6 increases in the negative direction the output current I7 increases in the positive direction in a linear manner from the origin point.

It can thus be seen that both magnitude and direction would be measured by the ammeter ADC with the measured value of I7 being directly proportional to the input current I6 being measured. The output current I7 could of course be utilized for control purposes such as overcurrent protection or for providing a directly proportional output in response to an electrically isolated input current being monitored.

What is claimed is:

1. In a system for detecting the magnitude and direction of a direct current, the combination of:
    a transformer including a magnetic core comprising a saturable material and primary and secondary windings;
    means for applying said direct current to be detected to selected of said secondary windings;
    an oscillator circuit coupled via said primary windings for oscillation with a substantially equal mark and space durations in the absence of said direct current to be detected and with unequal durations in the presence of said direct current to be detected;
    means responsive to said mark-and-space durations for providing a signal having a predetermined value when said durations are substantially equal and differing from said predetermined value in magnitude and direction in accordance with the magnitude and direction of inequality between said mark-and-space durations respectively; and
    means for comparing said signal with a reference signal and providing a comparison output in response thereto indicative of the magnitude and direction of said direct current to be detected.

2. The combination of claim 1 wherein:
    said means responsive to said mark-and-space durations includes
    another of said secondary windings responsive to said durations,
    integrating means for integrating the input thereto, and
    means for coupling said another winding to provide the input to said integrator means so that said integrator means provides said signal to said means for comparing.

3. The combination of claim 2 wherein:
    said another winding provides outputs of opposite polarity respectively in response to said mark-and-space durations of said oscillator, and
    said means for coupling comprises a switching device operative to be rendered conductive or nonconductive in response to the opposite polarity outputs respectively of said another winding.

4. The combination of claim 1 wherein:
    said means for comparing comprises differential amplifier means for receiving said signal as one input and said reference signal as another input and providing said comparison output as the difference therebetween.

5. The combination of claim 3 wherein:
    said means for coupling comprises differential amplifier means for receiving said signal as one input and said reference signal as another input and providing said comparison output as the difference therebetween.

6. The combination of claim 1 wherein:

said direct current to be detected comprises the algebraic sum of a first component and a second component, said first and second components are applied to first and second windings of said selected secondary windings, respectively.

7. THe combination of claim 6 wherein:

the turns-ratio between said first and second windings is selected so that substantially equal mark-and-space durations are provided when said second and first components bear the same ratio as said turns-ratio.

8. The combination of claim 7 wherein:

said first component and said second component are respectively supplied by first and second DC supplies, and said comparison output is indicative of the degree of unbalance between said first and second DC sources.

9. The combination of claim 1 wherein:

said transformer includes a feedback winding, and the combination includes means for applying a feedback direct signal to said feedback winding in response to said comparison output, said selected and said feedback windings are so wound that the magnetic flux produced in said coil in response to said direct current to be detected and said feedback direct current substantially balance out.

10. The combination of claim 9 includes means for measuring said feedback direct current as an indication of the direction and magnitude of said direct current to be detected.

* * * * *